United States Patent [19]

Dunn

[11] 3,959,204

[45] May 25, 1976

[54] LATEX STABILITY BY ADDITION OF FLUORIDE SALTS

[75] Inventor: Edwin Reed Dunn, Port Huron, Mich.

[73] Assignee: Polysar Limited, Sarnia, Canada

[22] Filed: Mar. 21, 1974

[21] Appl. No.: 453,645

[52] U.S. Cl. .................. 260/29.7 PT; 260/29.6 R; 260/29.6 PM; 260/29.6 PT; 260/29.6 RW; 260/29.7 H; 260/29.7 AT; 260/29.7 EM; 260/29.7 M; 423/290; 423/297

[51] Int. Cl.$^2$............................................. C08L 9/08

[58] Field of Search............. 260/29.6 R, 29.6 RW, 260/29.6 PM, 29.6 PT, 29.7 M, 29.7 PT, 29.7 H, 29.7 AT, 29.7 EM, 91, 92, 276–277; 423/290, 297

[56] References Cited
UNITED STATES PATENTS

| | | | |
|---|---|---|---|
| 2,914,474 | 11/1959 | Hillyer et al. | 423/490 |
| 3,337,453 | 8/1967 | DeLisle | 423/490 |
| 3,529,929 | 9/1970 | Page et al. | 423/490 |

FOREIGN PATENTS OR APPLICATIONS

| | | |
|---|---|---|
| 1,238,069 | 7/1971 | United Kingdom |

OTHER PUBLICATIONS

Blackley, High Polymer Latices I, pp. 28–29, 91–92 (Applied Science Ltd. 1966).

*Primary Examiner*—Wilbert J. Briggs, Sr.
*Assistant Examiner*—T. DeBenedictis, Sr.
*Attorney, Agent, or Firm*—Stevens, Davis, Miller & Mosher

[57] ABSTRACT

Latex-based coating materials are prepared frequently by compounding the latex with large quantities of calcium carbonate fillers. Whenever these fillers contain water-soluble calcium and magnesium compounds as impurities latices prepared with anionic emulsifiers are made more unstable, apparently because of reaction between these impurities and the emulsifier. This instability can be overcome by including in the latex a water-soluble fluoride such as ammonium or potassium fluoride in an amount generally under 5 parts by weight per 100 parts dry weight of latex. The process involves adding such a fluoride in an amount sufficient to stabilize the latex, generally under 5 parts per hundred of latex, dry weight.

12 Claims, No Drawings

LATEX STABILITY BY ADDITION OF FLUORIDE SALTS

This invention relates to a method of preventing destabilization of latices stabilized with anionic emulsifiers and compounded with calcium carbonate filler containing water soluble calcium and magnesium salts.

Calcium carbonate fillers that are generally used for making filled latex should contain little or no water soluble alkaline earth metal. Attempts have been made to use a less expensive source of fillers such as by taking the carbonate from low quality dolomite rock straight from the quarry and to use it in finely ground form. However, it has generally not been possible to obtain a latex having good stability with such fillers as they contain water soluble alkaline earth metal cations, notably calcium and magnesium, which interfere with the sensitive equilibrium of latex suspensions by reacting with the emulsifier.

The invention is applicable to those latices in which the stability is dependent on the emulsifying properties of water soluble anionic emulsifiers which form salts with alkaline earth metals, particularly calcium and magnesium, which salts are insoluble or less soluble in water than are the emulsifiers. Examples of such emulsifiers are alkali metal and ammonium salts of saturated and unsaturated $C_{8-20}$ carboxylic acids e.g. sodium caprylate, potassium laurate, sodium myristate, potassium palmitate, sodium stearate, potassium oleate; as well as emulsifiers related thereto, such as sodium oleyl sulfonate, potassium lauryl sulfate, sodium lauryl naphthalene sulfonate and sodium naphthalene sulfonate.

It has now been found that an alkaline latex which depends on the stabilizing properties of a water soluble anionic emulsifier for its stability can be made more resistant to the destabilizing effects of water soluble alkaline earth metal salts by including in the latex a small amount of an alkali metal or ammonium fluoride. Certain products prepared from such latex compositions have been found to exhibit improved water resistance as well.

The present invention therefore provides a method of forming a stable filled latex composition comprising a mixture of a latex and a finely ground calcium carbonate filler, said filler containing soluble calcium and magnesium ion salts as impurities, and said latex containing an anionic emulsifier as latex stabilizer. The invention resides in the step of adding an effective amount of soluble fluoride salt to said latex to precipitate said soluble calcium and magnesium ions.

The invention applies to latices of rubbery polymers including homopolymers of conjugated $C_4$-$C_{10}$ alkadienes such as butadiene-1,3, pentadiene-1,3, hexadiene-1,3, 2-methyl butadiene-1,3, 2,3-dimethylbutadiene-1,3, 2-amyl butadiene-1,3 etc. and copolymers of these dienes with each other and other olefinically unsaturated monomers such as the aryl olefins e.g. styrene, the α-methylene carboxylic acids and their esters, nitriles and amides e.g. acrylic acid methyl acrylate, methyl methacrylate, acrylonitrile, methacrylamide; methyl vinyl ether; methyl vinyl ketone and vinylidene chloride.

The soluble fluoride, particularly ammonium or potassium fluoride, is generally added in an amount of about 0.2 to 5 parts per hundred of latex, based on dry solids. The preferred range is 0.2 to 3.5 parts per 100, most preferably 0.5 to 2 parts per 100.

The advance to the art is important if one considers the difficulty of obtaining a means to solve the problem indicated above. For optimum performance of latex compositions the soap level has to be maintained.

Other attempts to use soluble salts to precipitate calcium were also unsuccessful. For example, ferrite salts and chromite salts act as dark pigments discolouring the latex compounds. Sodium silicates cause flocculation of the latex. Hypophosphate, molybdate, iodate and the like yield excessively soluble products. Other known additives detrimentally affect the surface tension of the dispersion. In general either the resulting products form salts of alkaline earth metal that are not insoluble enough, or else the reagents are not compatible with the latex, or the secondary products derived from the reaction of the cation of the reactant and the anion of the alkaline earth metal salts are not compatible with the latex.

In accordance with this invention the preferred soluble fluoride members are ammonium fluoride and potassium fluoride. Ammonium fluoride is particularly useful in this connection. The use of the preferred embodiment ammonium fluoride in the mixture appears in some cases to give slight improvement in room temperature wet adhesion, without affecting the hot wet adhesion.

Normally addition of a few parts per hundred of the fluoride is sufficient in order to obtain a good result and to stabilize the latex. A lower or higher amount may also be used, depending upon the latex system involved, and on other factors.

Where the latex is a carboxylated styrene-butadiene latex containing mercaptan and other polymerization additives, in addition to the ammonium fluoride, some ammonium carbonate may be also added in accordance with a preferred embodiment.

The process and storage equipment should be made from material which will tolerate exposure to the fluoride salts.

Such ammonium carbonate addition can prevent or reduce increase in the viscosity of the latex composition.

Tetrapotassium pyrophosphate (TKPP) may also be included in the formulation to improve filler acceptance.

The following examples will serve to illustrate the contribution of the applicant to the art.

EXAMPLE 1

The ability of potassium fluoride to counteract the latex destabilizing effect of fillers containing high amounts of water soluble calcium and magnesium salts as impurities was compared with a number of compounds previously known to have a stabilizing effect.

Aqueous solutions of about 5 weight percent concentration were prepared from tetrapotassium pyrophosphate (TKPP), potassium carbonate, the sodium salt of ethylenediamine tetraacetic acid, ammonium oxalate, sodium oxalate, sodium tetraborate, ammonium phosphate and potassium fluoride. 200 grams of a calcium carbonate filler containing 584 ppm water-soluble $Ca^{++}$ ions and 146 ppm water-soluble $Mg^{++}$ ions were mixed with amounts of each of the aqueous solutions such as to provide 0.02 moles of calcium per mole of salt in the aqueous solution. While keeping the filler slurry under agitation, 50 grams dry weight of a 50% solids latex of a rubbery carboxylic styrene-butadiene copolymer stabilized with sodium dodecylbenzene sulfonate were added to each of the slurries and the time required for each of the resulting compositions to thicken to an unusable condition was noted. A control sample containing water and filler but no salt solution was also included.

All slurries thickened to an unusable condition immediately except the ones containing the oxalic acid salts which took 10 minutes to reach this state and the one containing the potassium fluoride which had not yet reached this state after 4 hours of stirring.

EXAMPLE 2

Salt solutions as prepared in Example 1 were tested again but in this case they were mixed with the latex first with the dry filler being added last. All proportions were the same as in Example 1, except that sufficient water was added to the latex — salt solution mixture prior to adding the filler to provide a composition containing 75 weight percent dry solids after the filler was added.

In this test, only the potassium fluoride-containing latex composition remained fluid. The other latex compositions set up immediately i.e. their viscosities increased very rapidly to the point where they were no longer usable. These results show that only the fluoride provides acceptable stabilization.

Example 3

10 c.c. of a 3% aqueous solution of calcium chloride were added to samples (100 grams — dry weight basis) of a 50% solids latex of a rubbery carboxylic styrene-butadiene copolymer stabilized with sodium oleyl sulfonate and containing various amounts of ammonium fluoride. Addition was made while the latex was under good agitation. After a further 10 minutes of agitation, the latex was filtered through an 80 mesh screen and the amount of coagulum was determined.

A similar procedure was carried out with 10 c.c. of a 3% aqueous solution of equal parts of calcium chloride and magnesium chloride. The results are listed in Table I, where the parts of $NH_4F$ and % coagulum are stated by weight per 100 parts by weight of dry latex solids.

TABLE I

| $NH_4F$ — parts | % Coagulum latex contg. $CaCl_2$ | % Coagulum latex contg. $CaCl_2+MgCl_2$ |
|---|---|---|
| 0 | 5.25 | 3.45 |
| 0.167 | 2.94 | 2.16 |
| 0.25 | 1.37 | 0.84 |
| 0.50 | 0.48 | 0.21 |

These results show that when about 0.50 parts of $NH_4F$ is present it provides good stabilization.

EXAMPLES 4 to 9

Three rubbery carboxylic styrene-butadiene copolymer latices of about 50 weight percent total solids and about 50 weight percent bound styrene content and to which water-soluble fluoride salts had been added were compounded with fillers containing high amounts of water-soluble Ca and Mg salts. The effectiveness of the fluoride salts in preventing destabilization of the latex on addition of the filler was noted. Latex A contained sodium oleyl sulfonate as the stabilizer, Latex B contained sodium lauryl sulfate and Latex C contained sodium dodecylbenzene sulfonate. Filler A was a powdered calcium carbonate containing 1326 ppm of water-soluble Ca ions and 0.6 ppm of water-soluble Mg ions. Filler B was a powdered calcium magnesium carbonate containing 954 ppm water-soluble Ca ions and 138 ppm water-soluble Mg ions. Filler C was a powdered calcium magnesium carbonate containing 584 ppm water-soluble Ca ions and 146 ppm water-soluble Mg ions. The compounding recipes and the results are recorded in Table II where all parts and percentages are by weight based on 100 parts by weight of dry solids in the uncompounded latex.

Increase in viscosity on standing is an indication of decrease in stability of latex compounds. These results demonstrate the effectiveness of the fluoride salts in countering the destabilizing effects of impure fillers on latices prepared with anionic emulsifiers. Example 8 shows that latex compounds which have not been used up quickly enough and which have thickened up to an undesirable degree can be recovered for use by the addition of supplemental amounts of the fluoride salts.

TABLE II

| EXAMPLES | 4 | 5 | 6 | 7 | 8 | 9 |
|---|---|---|---|---|---|---|
| Latex | A | A | B | C | C | C |
| $NH_4F$ | 0.5 | 0.75 | 0.75 | 0.5 | 1.0 | — |
| $NH_4F.KF$ | — | — | — | — | — | 4.5 |
| $K_2CO_3$ | — | — | — | — | — | 1.5 |
| $K_4P_2O_7$ | — | — | — | — | — | 1.5 |
| Filler A | 300 | 300 | 300 | — | — | — |
| Filler B | — | — | — | 300 | 300 | — |
| Filler C | — | — | — | — | — | 300 |
| Polyacrylate thickener | (a) | (a) | (a) | 0.7 | 0.7 | 0.5 |
| Water | (b) | (b) | (b) | (b) | (b) | (b) |
| Viscosity — cps. | | | | | | |
| — initial | 12,000 | 12,000 | 12,000 | 36,000 | 39,000 | 32,000 |
| — after standing 2 days | — | — | — | solid gel | 100,000 | 65,000 |
| — after standing 2 days (c) | — | — | — | — | 80,000 | 32,000 |
| — after standing 7 days | 85,000 | 34,000 | 33,000 | — | 14,000 (d) | — |
| — after standing | 17,500 | — | 15,500 | — | — | 30,000 |

TABLE II-continued

| EXAMPLES | 4 | 5 | 6 | 7 | 8 | 9 |
|---|---|---|---|---|---|---|
| 7 days (c) | | | | | | |

(a) Sufficient to provide a viscosity of 12,000 centipoise as measured on a Brookfield LVT viscometer at room temp. using the No. 4 spindle at 6 rpm.
(b) Sufficient to provide a total solids content of 75 weight percent to the compound.
(c) The compound was subjected to good mixing for 1 minute before the viscosity was measured.
(d) After a supplemental addition of 1.5 parts $NH_4F$, 1.0 parts $K_4P_2O_7$ and 5 parts water, standing for 24 hours and agitating for 1 minute before measuring the viscosity.

The embodiments of the invention in which an exclusive property or privilege is claimed are defined as follows:

1. In a method for rendering an unstable latex composition more resistant to destabilization, said latex composition comprising a mixture of a latex and a finely ground calcium carbonate filler, said filler containing soluble calcium and magnesium ion salts as impurities, and said latex containing an anionic emulsifier as latex stabilizer, the step of adding about 0.2 to 5 parts by weight of soluble fluoride salt per hundred parts by weight of latex solids to said latex to precipitate said soluble calcium and magnesium ions.

2. A method as in claim 1 wherein the latex is a synthetic rubber latex.

3. A method as in claim 2 wherein the latex is a butadiene rubber latex.

4. A method as in claim 2 wherein the latex is chosen from styrene-butadiene copolymer latex, acrylic ester latex and butyl acrylate-methyl acrylate copolymer latex.

5. A method as in claim 4 wherein the latex is a carboxylated styrene-butadiene copolymer latex.

6. A method as in claim 4 wherein the latex is a carboxylated acrylic ester latex.

7. A method as in claim 2 wherein the fluoride is chosen from ammonium and potassium fluorides.

8. A method as in claim 7 further comprising ammonium carbonate.

9. A method as in claim 2 wherein the soluble fluoride is added in an amount of 0.2 to 3.5 parts per hundred of latex based on dry solids.

10. A method as in claim 2 wherein the soluble fluoride is added in an amount of 0.5 to 2 parts per hundred of latex based on dry solids.

11. A stable filled latex composition comprising a mixture of a synthetic rubber latex, an anionic emulsifier as stabilizer, finely ground impure calcium carbonate filler, and precipitated calcium and magnesium fluorides.

12. A latex composition as in claim 11 wherein the synthetic rubber latex is a carboxylated styrene-butadiene copolymer latex.

* * * * *